United States Patent
Kobayashi et al.

(10) Patent No.: US 10,853,145 B2
(45) Date of Patent: Dec. 1, 2020

(54) INFORMATION PROCESSING APPARATUS, METHOD AND NON-TRANSITORY COMPUTER-READABLE STORAGE MEDIUM

(71) Applicant: FUJITSU LIMITED, Kawasaki (JP)

(72) Inventors: Noboru Kobayashi, Tokorozawa (JP); Tadashi Nakamura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 162 days.

(21) Appl. No.: 16/021,343

(22) Filed: Jun. 28, 2018

(65) Prior Publication Data

US 2019/0012206 A1 Jan. 10, 2019

(30) Foreign Application Priority Data

Jul. 4, 2017 (JP) .................................. 2017-131387

(51) Int. Cl.
   *G06F 9/50* (2006.01)
   *G06F 9/48* (2006.01)
   *H04W 72/12* (2009.01)

(52) U.S. Cl.
   CPC .......... *G06F 9/5038* (2013.01); *G06F 9/4881* (2013.01); *H04W 72/12* (2013.01); *H04W 72/1205* (2013.01)

(58) Field of Classification Search
   CPC .................................................. G06F 9/5038
   See application file for complete search history.

(56) References Cited

U.S. PATENT DOCUMENTS

| | | | |
|---|---|---|---|
| 2002/0078247 A1* | 6/2002 | Lu | H04L 12/2838 709/251 |
| 2009/0183168 A1* | 7/2009 | Uchida | G06F 9/5027 718/104 |
| 2015/0142958 A1 | 5/2015 | Tamura et al. | |
| 2015/0205644 A1* | 7/2015 | Ito | G06F 9/52 718/103 |
| 2015/0222515 A1 | 8/2015 | Mimura et al. | |
| 2017/0353878 A1 | 12/2017 | Yamada | |

FOREIGN PATENT DOCUMENTS

| | | |
|---|---|---|
| JP | 2013-239913 | 11/2013 |
| JP | 2015-149578 | 8/2015 |
| WO | 2016/092851 | 6/2016 |

\* cited by examiner

*Primary Examiner* — Charlie Sun
(74) *Attorney, Agent, or Firm* — Fujitsu Patent Center

(57) ABSTRACT

An information processing apparatus configured to execute a wireless communication with a terminal device, the information processing apparatus includes a memory, a first processor coupled to the memory and configured to execute an calculation processing for the wireless communication, and a second processor configured to obtain schedule information indicating schedule of the wireless communication, identify, based on the schedule information, an amount of calculation resource to be used for the calculation processing, and allocate, based on the schedule information, the identified amount of the calculation resource to the calculation processing for the wireless communication with the terminal device.

14 Claims, 18 Drawing Sheets

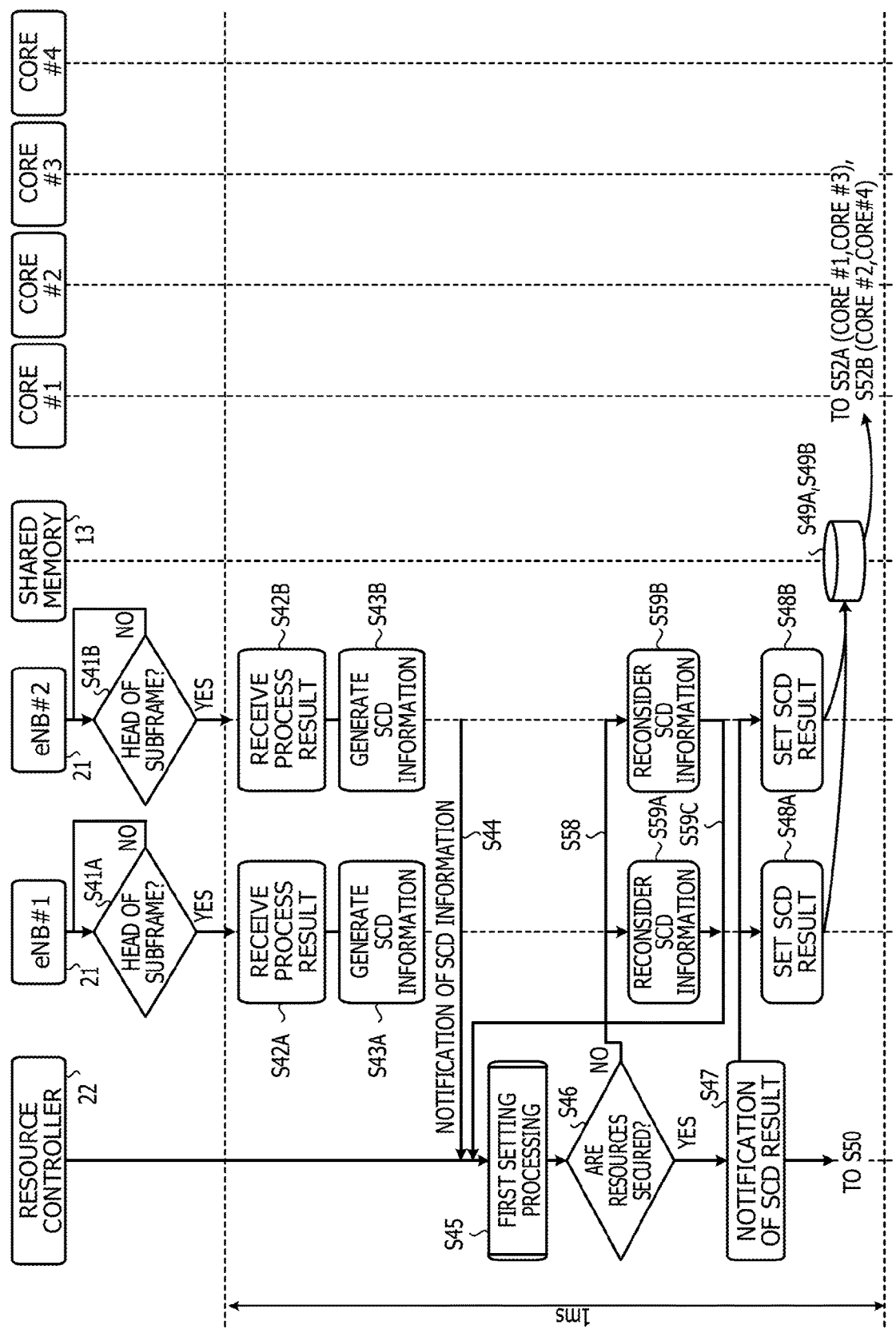

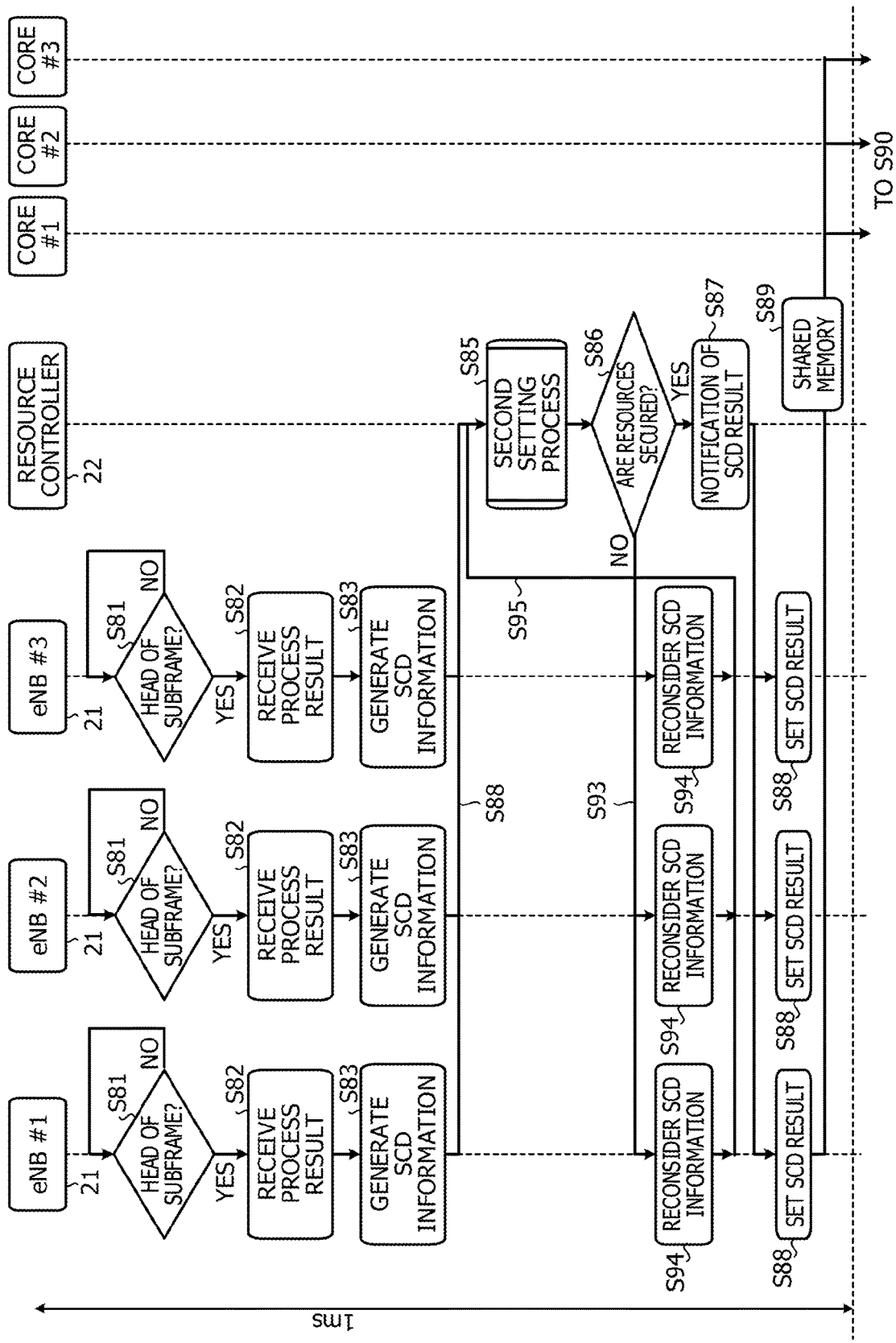

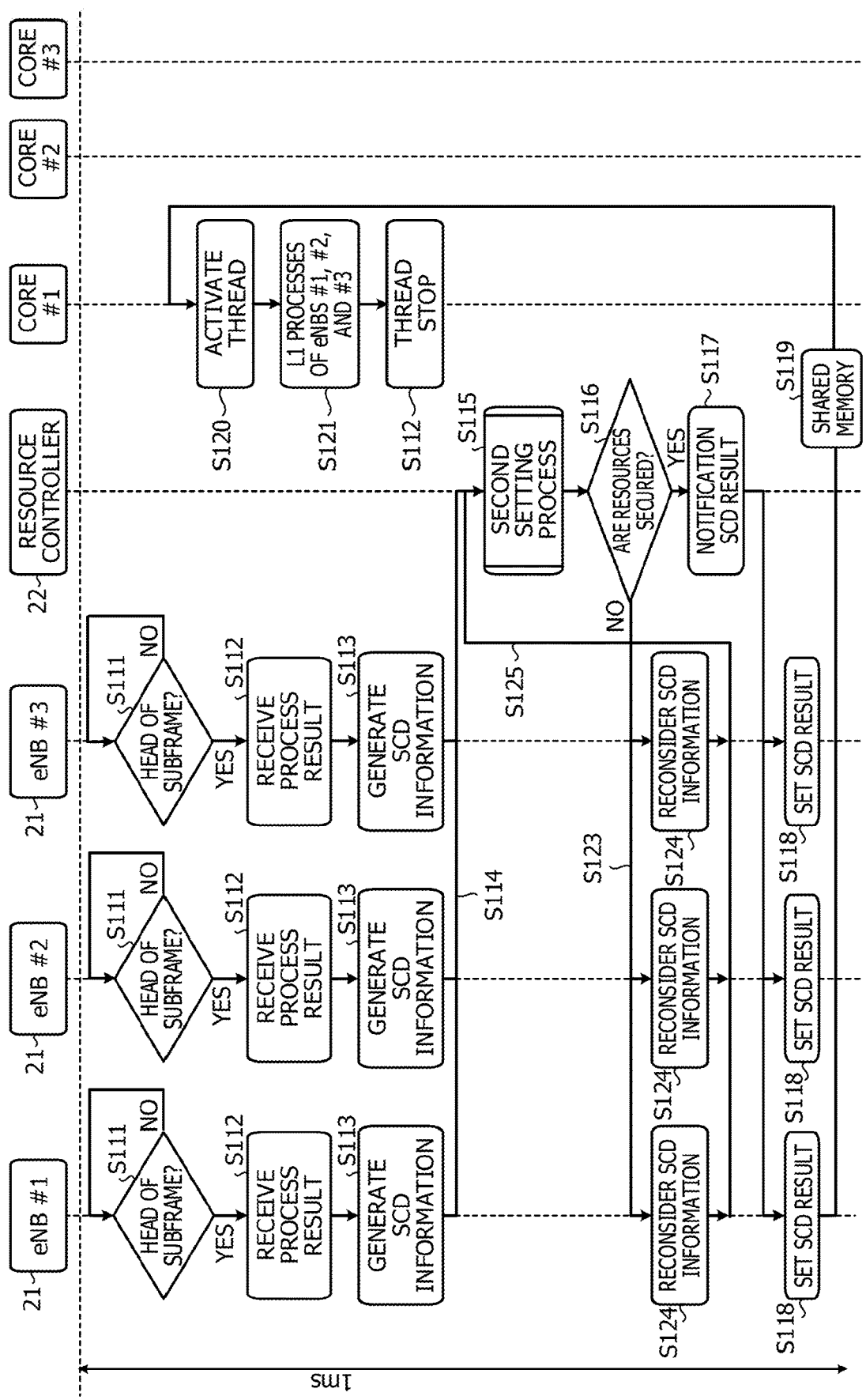

INFORMATION PROCESSING APPARATUS, METHOD AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2017-131387, filed on Jul. 4, 2017, the entire contents of which are incorporated herein by reference.

FIELD

The embodiments discussed herein are related to an information processing apparatus, a method and a non-transitory computer-readable storage medium.

BACKGROUND

In recent years, for example, software defined network (SDN) and network function virtualization (NFV) have been widely known. Further, the introduction of the SDN and the NFV, for example, into not only the function of core network equipment but also into the function of a base station that is wirelessly coupled to a mobile station in the wireless system, specially the introduction thereof into the layer 1 function of the base station, is also discussed.

A server includes a plurality of central processing units (CPUs), and each CPU is a multi-core CPU including a plurality of cores. Further, the sever fixedly allocates, by considering the maximum data transfer amount of the base station, a function of each base station to each core in the CPU. A user of the mobile station generally have many occasions, for example, to use a service form of downlink (DL) in which a moving image site is watched by the mobile station, and a few occasion to use a service form of uplink (UL) in which a large amount of data is transmitted from the mobile station to the base station. In addition, for example, DL processing such as decoding and demodulation uses the processing load approximately ⅓ of UL processing such as coding and modulation. Accordingly, the processing load largely differs between the UL processing and the DL processing. Related technologies are disclosed in Japanese Laid-open Patent Publication Nos. 2015-149578 and 2013-239913, and International Publication Pamphlet No. WO 2016/092851.

SUMMARY

According to an aspect of the invention, an information processing apparatus configured to execute a wireless communication with a terminal device, the information processing apparatus includes a memory, a first processor coupled to the memory and configured to execute an calculation processing for the wireless communication, and a second processor configured to obtain schedule information indicating schedule of the wireless communication, identify, based on the schedule information, an amount of calculation resource to be used for the calculation processing, and allocate, based on the schedule information, the identified amount of the calculation resource to the calculation processing for the wireless communication with the terminal device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 9A and 9B are sequence diagrams illustrating one example of process operations by the resource controller, the eNB, and the CPU related to the time when the first setting process is executed;

FIGS. 13A, 13B and 13C are sequence diagrams illustrating one example of process operations by the resource controller, the eNB, and the CPU related to the time when the second setting process is executed.

DESCRIPTION OF EMBODIMENTS

In an information processing apparatus such as a server, functions of base stations are fixedly allocated to resources of a CPU. However, the load amount of the function of the base station varies in accordance with the communication status, so that, for example, the less load amount makes the resources of the CPU that are fixedly allocated to the function of the base station useless. Moreover, for example, the load amount of the function of the base station largely exceeding the allocated amount of resources in the CPU makes the function of the base station difficult to handle the processing. In other words, the resources of the CPU are not efficiently used in accordance with the communication status in the base station. In addition, the CPU costs high and largely consumes the electric power, so that efficient allocation of the CPU resources is demanded in the actual situation.

Hereinafter, based on the drawings, embodiments of an information processing apparatus and a resource allocation method, which are disclosed in the present application, are described in details. Note that the present embodiments do not limit the disclosed technology. Moreover, the present embodiments indicated below may be combined as appropriate within a range where no contradiction occurs.

First Embodiment

Figure 1:
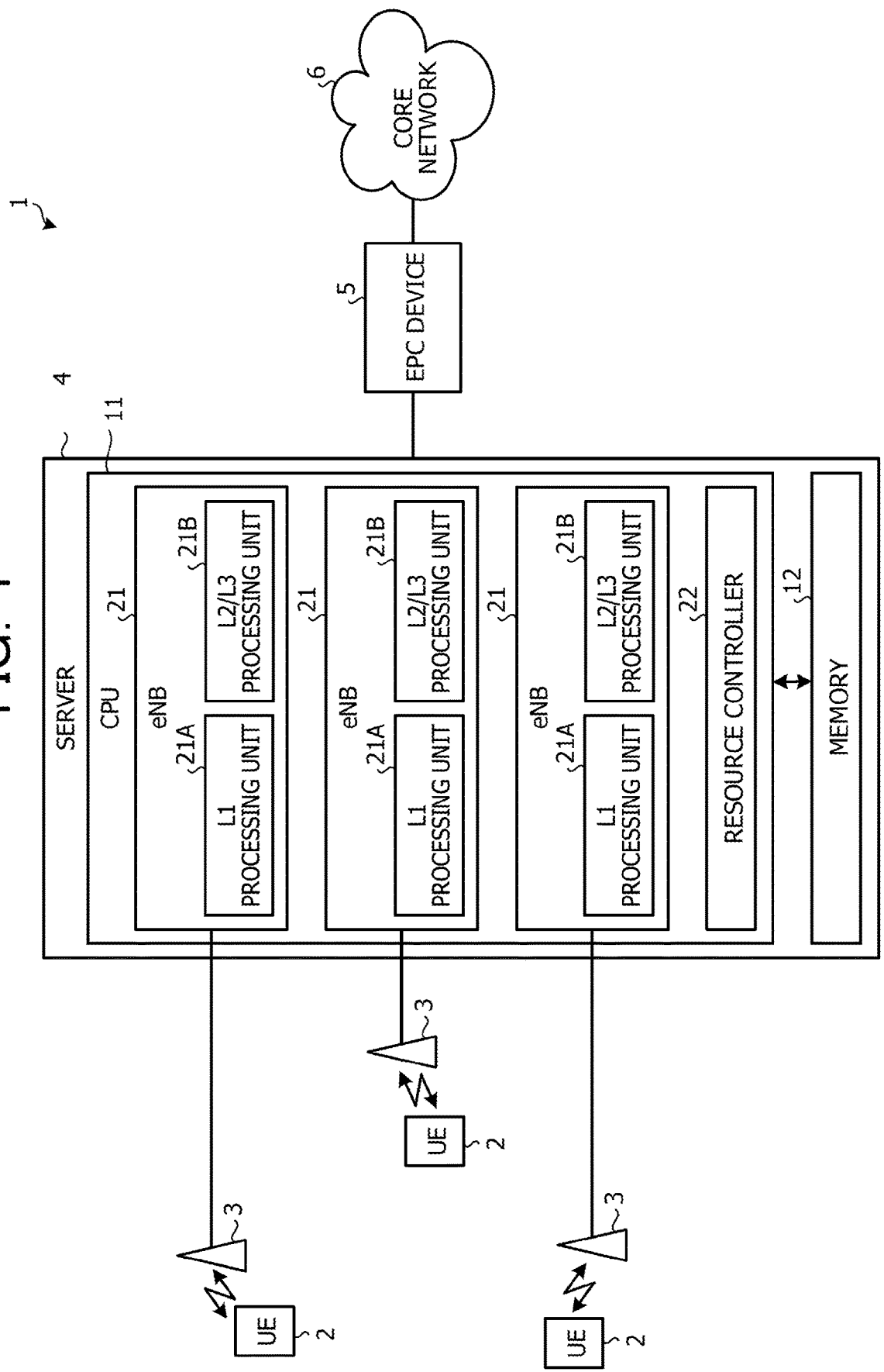
FIG. 1 is a block diagram illustrating one example of a wireless system according to a present embodiment.

FIG. 1 is a block diagram illustrating one example of a wireless system 1 according to a present embodiment. The wireless system 1 illustrated in FIG. 1 includes a plurality of user equipment (UE) 2, antennas 3 that are wirelessly coupled to the UE 2 in respective cells, a server 4, an evolved packet core (EPC) device 5, and a core network 6 such as the Internet, for example. Each UE 2 is, for example, a mobile station of the Long Term Evolution (LTE) scheme.

Figure 2:
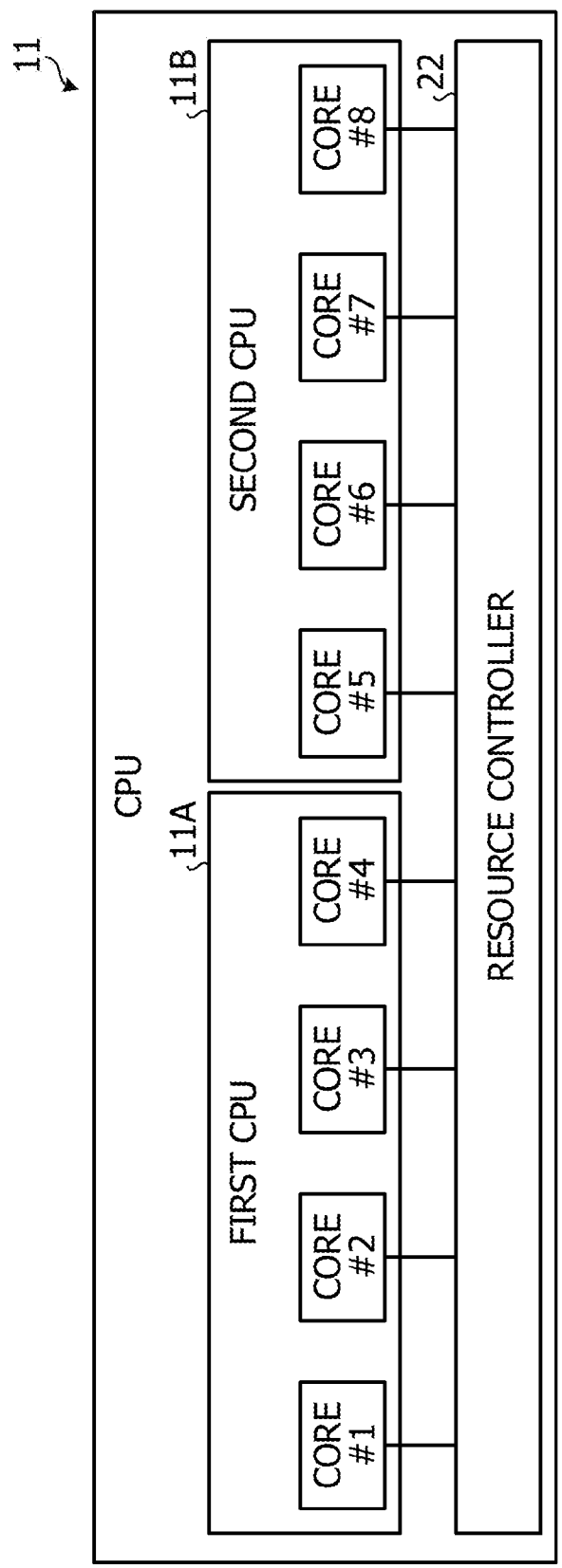
FIG. 2 is an explanation diagram illustrating one example of a function configuration in a CPU.

The server 4 includes a central processing unit (CPU) 11, and a memory 12. FIG. 2 is an explanation diagram illustrating one example of a function configuration in the CPU 11. The CPU 11 includes, for example, a first CPU 11A and a second CPU 11B. The first CPU 11A is, for example, a multi-core CPU including a core #1, a core #2, a core #3, and a core #4. The second CPU 11B is, for example, a multi-core CPU including a core #5, a core #6, a core #7, and a core #8. The CPU 11 executes, for example, a process function of a resource controller 22 on resources different from those of the first CPU 11A and the second CPU 11B. Note that for convenience of explanation, the resource controller 22 is configured to execute the process function on the resources different from those of the first CPU 11A and the second CPU 11B, however, the resource controller 22 may be configured to execute the process function on the resource of the first CPU 11A or the second CPU 11B. The server 4 uses the resources in the CPU 11, and implements, for example, software defined network (SDN) or network function virtualization (NFV). The server 4 allocates the process functions of a base station (eNB: Evolved Node B) 21 and the resource controller 22, to the resources of the CPU 11. The eNB 21 is coupled to the antenna 3, and is a wireless device on the resources that executes a process function as a base station for the UE 2 wirelessly coupled to the antenna 3. The resource controller 22 is a controller on the resources that executes, based on the amount of resources for each eNB 21, a process function of deciding the allocation core to each eNB 21 in units of subframes. The EPC device 5 is a gateway device that couples between the server 4, and the core network 6 that contains an access network of the LTE scheme.

The resource controller 22 has an allocation function to dynamically allocate the respective eNBs 21 on the resources of the CPU 11. The eNB 21 includes a Layer1 (L1) processing unit 21A and a Layer2 (L2)/Layer3 (L3) processing unit 21B. The L1 processing unit 21A is a process function to execute a process of L1. The L2/L3 processing unit 21B is a process function to execute a process of L2/L3.

Figure 3:
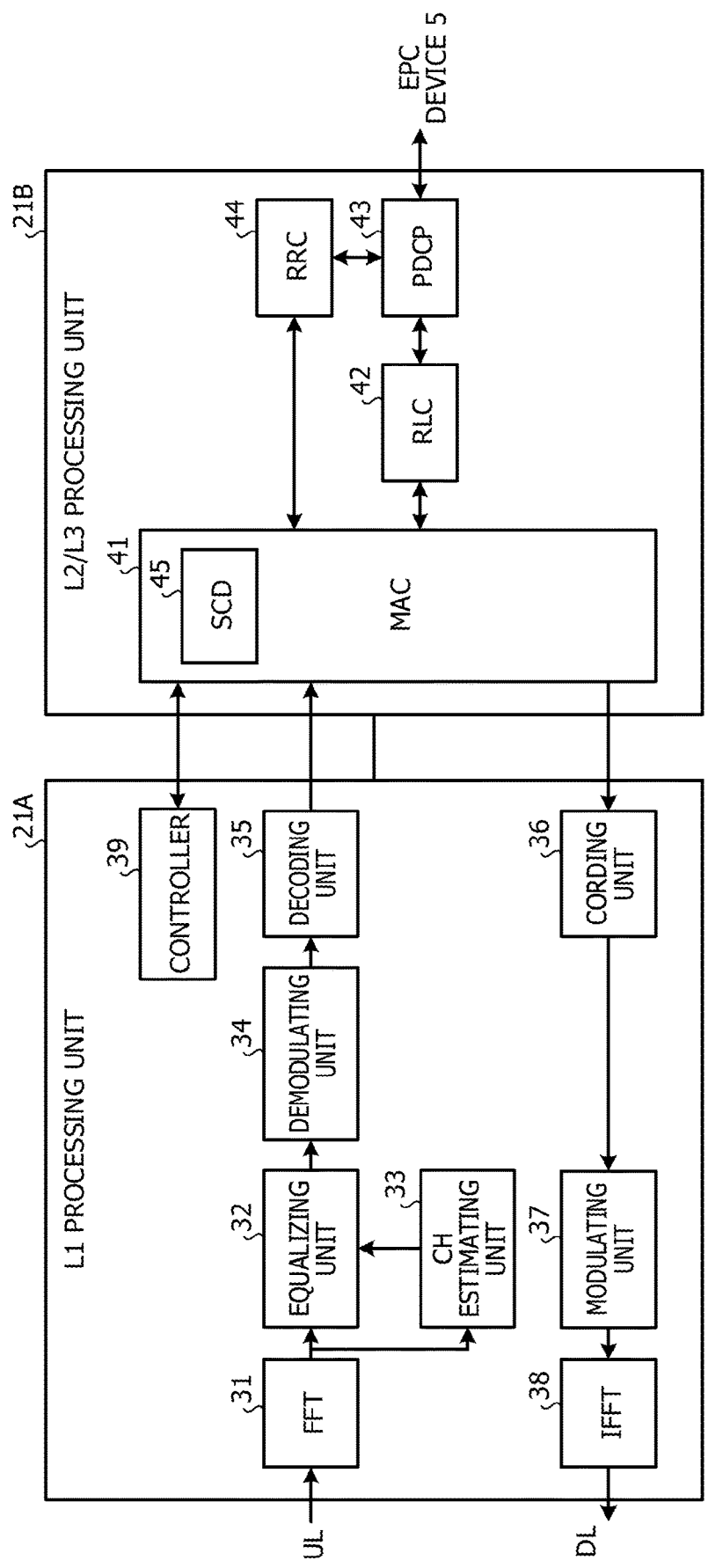
FIG. 3 is a block diagram illustrating one example of a function configuration in an eNB.

FIG. 3 is a block diagram illustrating one example of a function configuration in the eNB 21. The L1 processing unit 21A in the eNB 21 illustrated in FIG. 3 includes a fast Fourier transform (FFT) 31, an equalizing unit 32, a channel (CH) estimating unit 33, a demodulating unit 34, a decoding unit 35, a coding unit 36, and a modulating unit 37. In addition, the L1 processing unit 21A includes an inverse fast Fourier transform (IFFT) 38 and a controller 39. The FFT 31 executes the FFT process with respect to an uplink radio signal, and converts the uplink radio signal from the uplink radio signal in the time region into the uplink radio signal in the frequency region. The CH estimating unit 33 estimates a channel from a pilot signal of the uplink radio signal after the FFT process. The equalizing unit 32 subjects, based on a channel estimation result, the uplink radio signal after the FFT process to an equalizing process. The demodulating unit 34 demodulates the uplink radio signal after the equalizing process. The decoding unit 35 decodes the uplink radio signal after being demodulated. The decoding unit 35 outputs data after being decoded to an medium access control (MAC) 41. The coding unit 36 codes the data obtained from the MAC 41. The modulating unit 37 modulates the coded data. The IFFT 38 coverts the data after being modulated into a downlink radio signal in the frequency region into a downlink radio signal in the time region. The controller 39 controls the L1 processing unit 21A.

The L2/L3 processing unit 21B in the eNB 21 includes the MAC 41, a radio link control (RLC) 42, a packet data convergence protocol (PDCP) 43, and a radio resource control (RRC) 44. The MAC 41 executes a MAC process of converting data of L1 from the decoding unit 35 into data of L2 to output the data of L2 to the RLC 42, and converting the data of L2 from the RLC 42 into data of L1 to output the data of L1 to the coding unit 36. The RLC 42 executes an RLC process of controlling a radio link of L2. The RRC 44 executes an RRC process of controlling a wireless channel. The PDCP 43 is provided between the EPC device 5 and the RLC 42, and executes a PDCP process of converting data into an IP protocol. The MAC 41 includes a scheduler (SCD) 45. The SCD 45 generates, based on the data retention amounts of buffers, which are not illustrated, in the RLC 42 and the PDCP 43, and the data transmission amount that is reported from the UE 2, MAC schedule information (SCD information) related to the wireless communication of the eNB 21, for each subframe. In addition, the SCD 45 notifies the resource controller 22 of the SCD information. Note that the L1 processing unit 21A is a part with the processing amount of data communication with the UE 2 increasing in units of subframes of 1 millisecond. Note that subframes of the LTE scheme have intervals of 1 millisecond.

For example, the core #1 and the core #5 in the CPU 11 respectively cause the SCD 45 in an eNB #1 and the SCD 45 in an eNB #2 to execute. Each SCD 45 generates, based on information on the data retention amount included in a buffer, which is not illustrated, in the RLC 42 or the data transmission amount reported from the UE 2, SCD information for deciding the data transmission amount in units of subframes about how data is transmitted and received. The resource controller 22 calculates the amount of resources used by each eNB based on SCD information from each SCD 45. Further, the resource controller 22 decides, based on the amount of resources for each eNB, the allocation core to each eNB in units of subframes, out of the plurality of cores in the CPU 11.

Figure 4:
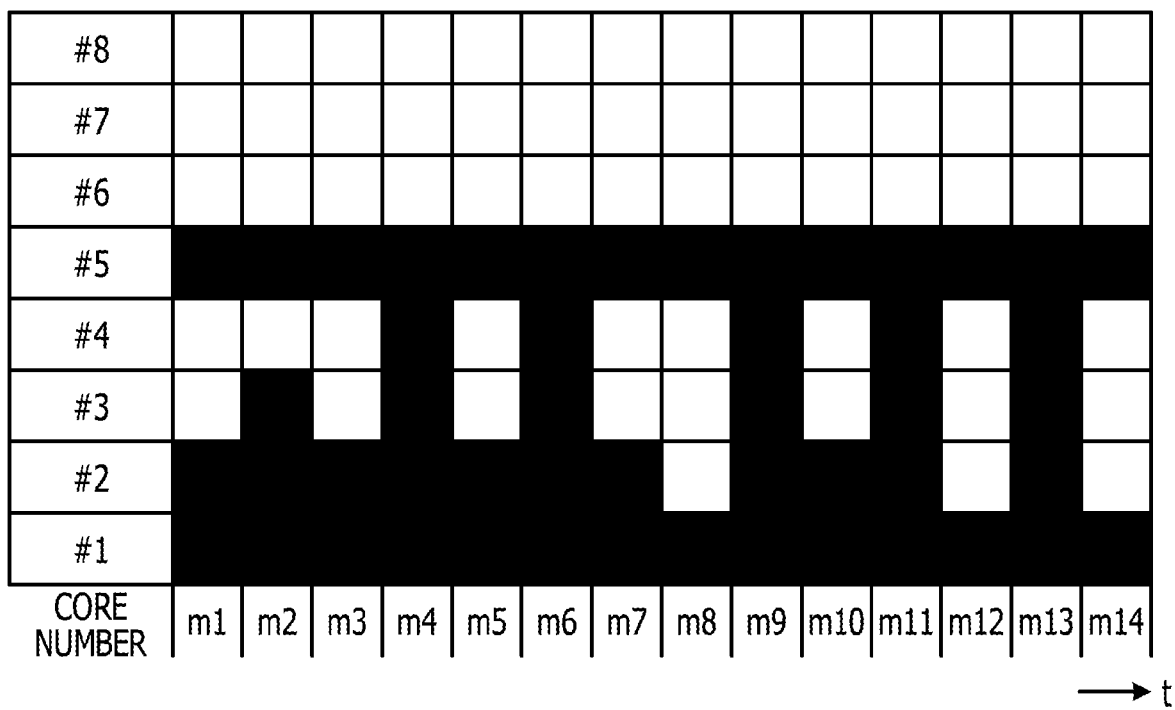
FIG. 4 is an explanation diagram illustrating one example of an operating status of the CPU.

FIG. 4 is an explanation diagram illustrating one example of an operating status of the CPU 11. For example, in a case of timing of a subframe m1, as illustrated in FIG. 4, the cores

1, #2, and #5 are in an operating state. The resource controller 22 allocates an L1 process of the eNB #1 to the cores #1 and #2, and an L1 process of the eNB #2 to the core #5. Moreover, in a case of timing of a subframe m2, the cores #1, #2, #3, and #5 are in an operating state. The resource controller 22 allocates, for example, the L1 process of the eNB #1 to the cores #1 and #2, and the L1 process of the eNB #2 to the cores #3 and #5. Moreover, in a case of timing of a subframe m6, the cores #1 to #5 are in an operating state. The resource controller 22 allocates the L1 process of the eNB #1 to the cores #1 to #3, and the L1 process of the eNB #2 to the cores #4 and #5. In other words, the operating states of the cores #1 to #8 vary for each subframe.

Figure 5:
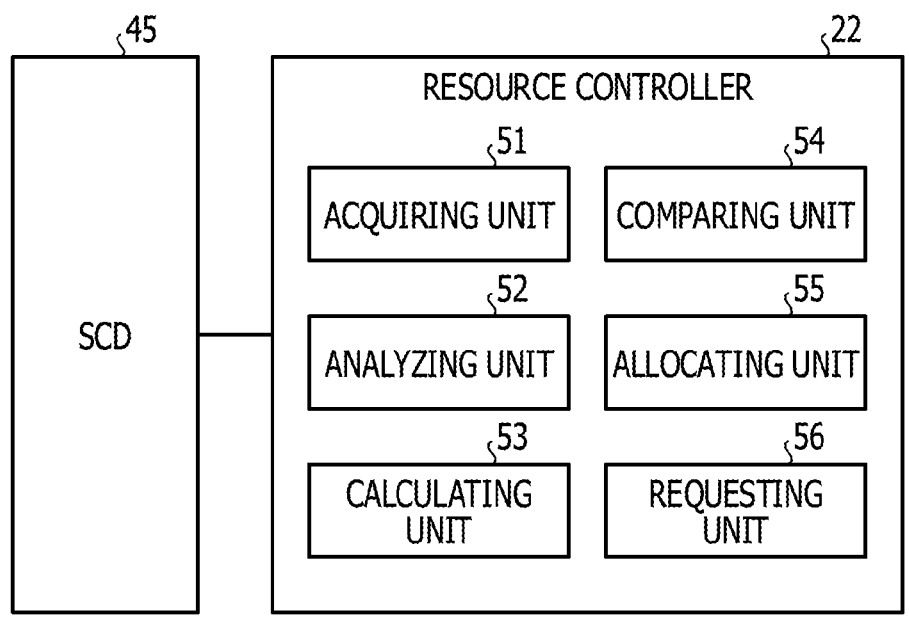
FIG. 5 is an explanation diagram illustrating one example of an SCD and a resource controller.

FIG. 5 is an explanation diagram illustrating one example of the SCD 45 and the resource controller 22. The resource controller 22 illustrated in FIG. 5 includes an acquiring unit 51, an analyzing unit 52, a calculating unit 53, a comparing unit 54, an allocating unit 55, and a requesting unit 56. The acquiring unit 51 acquires SCD information related to the wireless communication from the SCD 45 in the eNB 21. The analyzing unit 52 analyzes the SCD information. The calculating unit 53 calculates, based on an analyzed result of the SCD information, a usable amount of resources used by the eNB 21 on the CPU resources. Note that the amount of resources is, for example, the amount of CPU resources used by the function of the eNB 21. The comparing unit 54 compares the calculated amount of resources for the eNB 21 with the allowable amount of resources of the CPU resources. Note that the allowable amount of resources is an amount of CPU resources that the CPU 11 is capable of allocating. When the calculated amount of resources for the eNB 21 is equal to or less than the allowable amount of resources, in other words, when the resources are secured, the allocating unit 55 allocates, based on the calculated amount of resources to be used in the eNB 21, the eNB 21 on the CPU resources. When the calculated amount of resources for the eNB 21 exceeds the allowable amount of resources, in other words, when the resources have been unable to be secured, the requesting unit 56 selects, based on the priority order, which is described later, the eNB 21 as a re-SCD target. Further, the requesting unit 56 requests the SCD 45 in the selected eNB 21 to reconsider the SCD information. The SCD 45 reconsiders the SCD information, in response to a reconsider request of the SCD information from the resource controller 22, by considering already adjusted SCD information or the usable maximum data rate.

Figure 6:
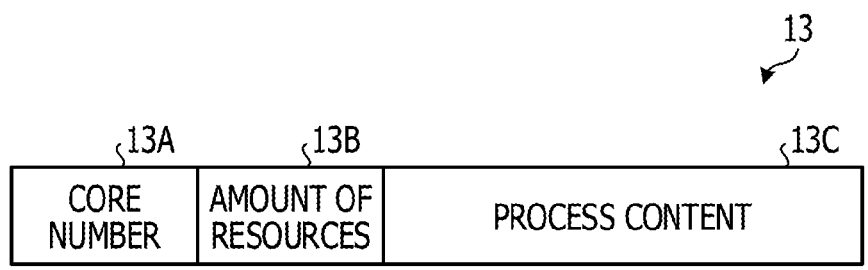
FIG. 6 is an explanation diagram illustrating one example of a table configuration of a shared memory.

FIG. 6 is an explanation diagram illustrating one example of a table configuration of a shared memory 13. Note that the shared memory 13 is present in the memory 12. The shared memory 13 includes a core number 13A, an amount of resources 13B, and a process content 13C. The core number 13A is a number for identifying a core. The amount of resources 13B is the amount of resources being used by the core. The process content 13C is a process content executed by the core. Note that the resource controller 22 refers to the amount of resources for each core in the shared memory 13, and compares the maximum amount of resources of each core with the current amount of resources to recognize the allowable amount of resources. Note that the maximum amount of resources is the maximum amount of CPU resources that is usable in the core, and the current amount of resources is the amount of CPU resources that is being used in the core.

Figure 7:
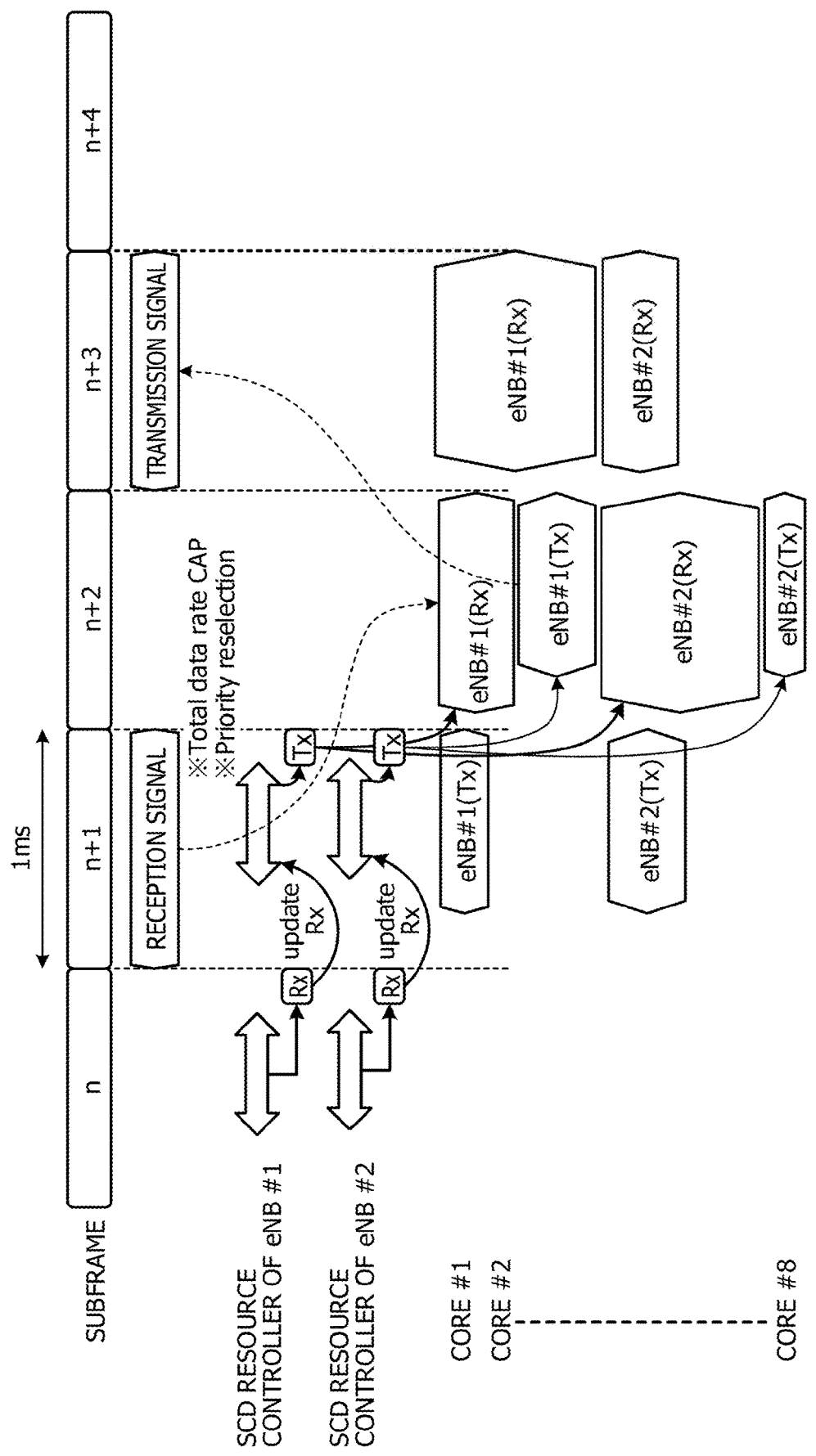
FIG. 7 is an explanation diagram illustrating one example of a process status of the SCD, the resource controller, and the CPU in units of subframes.

An operation of the wireless system 1 in the first embodiment is next described. FIG. 7 is an explanation diagram illustrating one example of the process status of the SCD 45, the resource controller 22, and the CPU 11 in units of subframes. Note that the subframes are provided, for example, in the order of n, n+1, n+2, n+3 .... At the timing of the subframe n, UL scheduling of the subframe n+2 is executed. The demodulating process and the decoding process are executed to the signal received at the timing of the subframe n+1, at the timing of the subframe n+2. Moreover, at the timing of the subframe n+1, DL scheduling of a transmission signal to be transmitted in the subframe n+3 is executed. At the timing of the subframe n+2, a generating process of a transmission signal to be transmitted in the subframe n+3 is executed. UL/DL resources that conflict with each other in the subframe n+2 are subjected to MAC scheduling at different times.

The resource controller 22 calculates the amount of resources to be used for the UL processing based on the UL SCD information of the eNBs #1 and #2 in the subframe n+2. In addition, the resource controller 22 calculates the amount of resources to be used for the DL processing based on the DL SCD information of the eNBs #1 and #2. The resource controller 22 determines whether the CPU resources to be allocated to the eNBs #1 and #2 are able to be secured, based on the amounts of resources of UL and DL of the eNBs #1 and #2. If the CPU resources to be allocated to the eNBs #1 and #2 are able to be secured, the resource controller 22 notifies each of the eNBs #1 and #2 of an SCD result including the resource information in which each of the eNBs #1 and #2 is allocated to each core. The eNBs #1 and #2 respectively set the SCD results to the shared memory 13. As a result, the respective cores corresponding to the SCD results activate threads that execute the L1 processes of the respective eNBs #1 and #2, based on the SCD results in the shared memory 13. Each thread executes the L1 process to execute the actual radio signal process based on the SCD result for each eNB. Moreover, when the CPU resources to be allocated to the eNBs #1 and #2 have been unable to be secured, the resource controller 22 requests the SCD 45 in each of the eNBs #1 and #2 to reconsider the SCD information.

The SCD 45 in the eNB #1 notifies the resource controller 22 of the UL SCD information, and the SCD 45 in the eNB #2 notifies the resource controller 22 of the UL SCD information. Further, the resource controller 22 sets, based on the amount of resources corresponding to the UL SCD information and the allowable amount of resources of each core, the SCD result including the resource information on each of the eNBs #1 and #2 the shared memory 13. At the timing of the subframe n+2, each core demodulates and decodes the reception signal based on the SCD result including the resource information of subframe n in the shared memory 13. At the timing of a subframe n+2, the SCD 45 in the eNB #1 notifies the resource controller 22 of the DL SCD information, and the SCD 45 in the eNB #2 notifies the resource controller 22 of the DL SCD information. Further, the resource controller 22 sets, based on the amount of resources corresponding to the DL SCD information and the allowable amount of resources of the core, the SCD result including the resource information on each of the eNBs #1 and #2 the shared memory 13. At the timing of the subframe n+3, each core codes and modulates the transmission signal based on the SCD result including the resource information in the shared memory 13.

Figure 8:
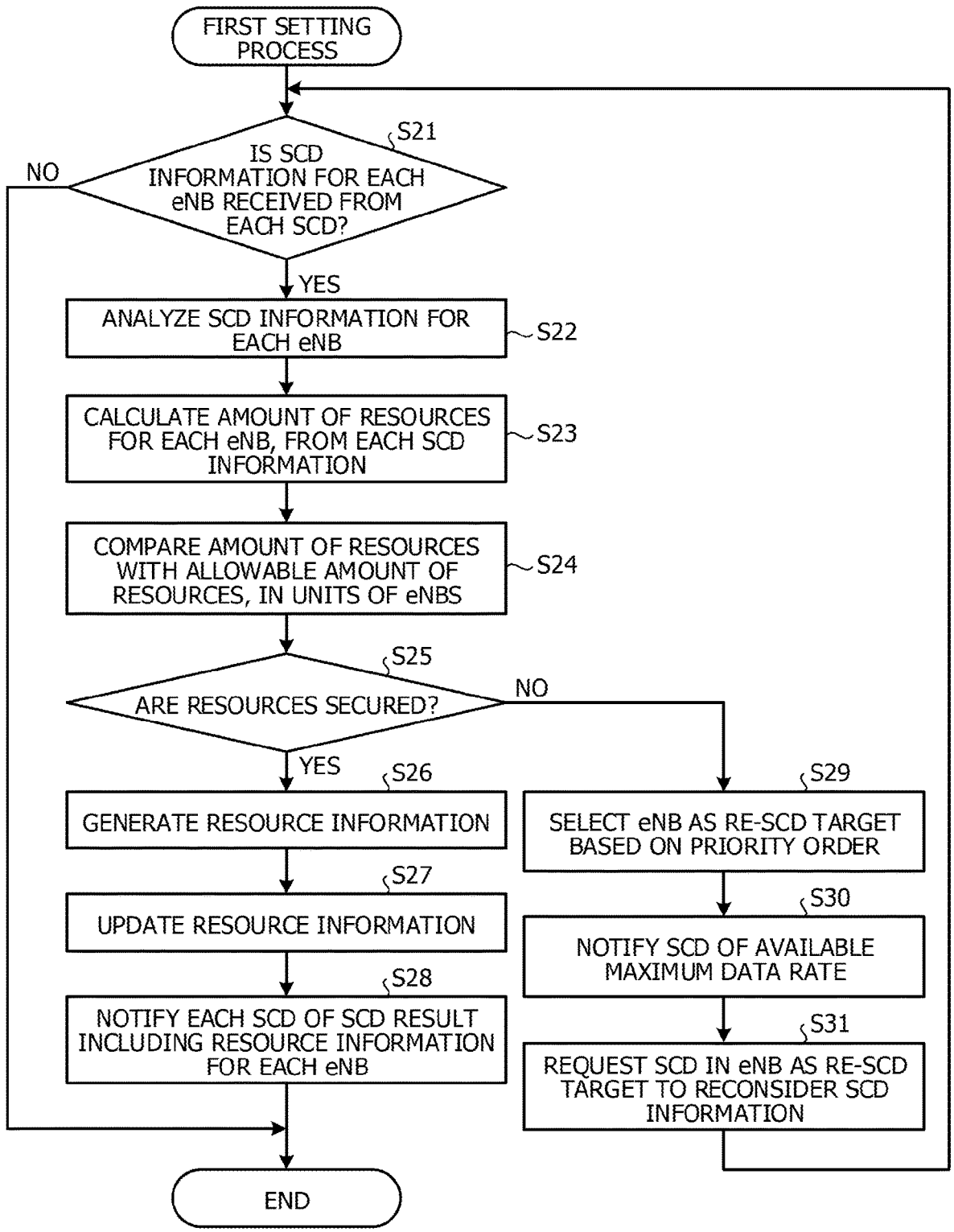
FIG. 8 is a flowchart illustrating one example of a process operation by the resource controller related to a first setting process.

FIG. 8 is a flowchart illustrating one example of a process operation by the resource controller 22 related to a first setting process. The resource controller 22 determines whether SCD information for each eNB 21 is received from each SCD 45 (step S21). If SCD information for each eNB 21 is received (Yes at step S21), the resource controller 22 analyzes the SCD information for each eNB 21 (step S22).

The resource controller 22 calculates the amount of resources for each eNB 21, from each SCD information (step S23). After calculating the amount of resources for each eNB 21, the resource controller 22 compares the amount of resources with the allowable amount of resources, in units of the eNBs 21 (step S24). The resource controller 22 determines whether the amount of resources for each eNB 21 has been able to be secured on the core, based on the comparison result (step S25). If the amount of resources for each eNB 21 has been able to be secured on the core (Yes at step S25), the resource controller 22 generates resource information (step S26). Note that the resource information is, for example, information including the amount of resources of a core or the like that is allocated to the function of the eNB 21. The resource controller 22 updates the generated resource information (step S27), notifies each SCD 45 of the SCD result including the resource information for each eNB 21 (step S28), and ends the process operation illustrated in FIG. 8.

If the amount of resources for each eNB 21 has been unable to be secured on the core (No at step S25), the resource controller 22 selects an eNB 21 as a re-SCD target based on the priority order (step S29). The resource controller 22 notifies the SCD 45 in the selected eNB 21 as a re-SCD target of the available maximum data rate (step S30). In addition, the resource controller 22 requests the SCD 45 in the eNB 21 as a re-SCD target to reconsider the SCD information (step S31), and shifts the process operation to the step S21 in order to determine whether SCD information for each eNB 21 is received. If SCD information for each eNB 21 is not received (No at step S21), the resource controller 22 ends the process operation illustrated in FIG. 8.

The resource controller 22 calculates the amount of resources for each eNB 21 based on the SCD information from the SCD 45 in each eNB 21. The resource controller 22 compares the calculated amount of resources with the allowable amount of resources, and determines whether the resources for the eNB 21 are secured. If the resources for the eNB 21 are secured, the resource controller 22 generates resource information, and notifies each SCD 45 of the SCD result including the resource information for each eNB 21. As a result, the resource controller 22 is able to notify the SCD 45 of the resource information including a core to be allocated to the eNB 21 in accordance with the SCD information of the eNB 21.

If the resources for the eNB 21 have been unable to be secured, the resource controller 22 selects the eNB 21 as a re-SCD target based on the priority order, and notifies the selected eNB 21 of the available maximum data rate to request the selected eNB 21 to reconsider the SCD information. As a result, the resource controller 22 is able to acquire the reconsidered SCD information from the SCD 45 in the eNB 21 as a re-SCD target.

Figure 9B:
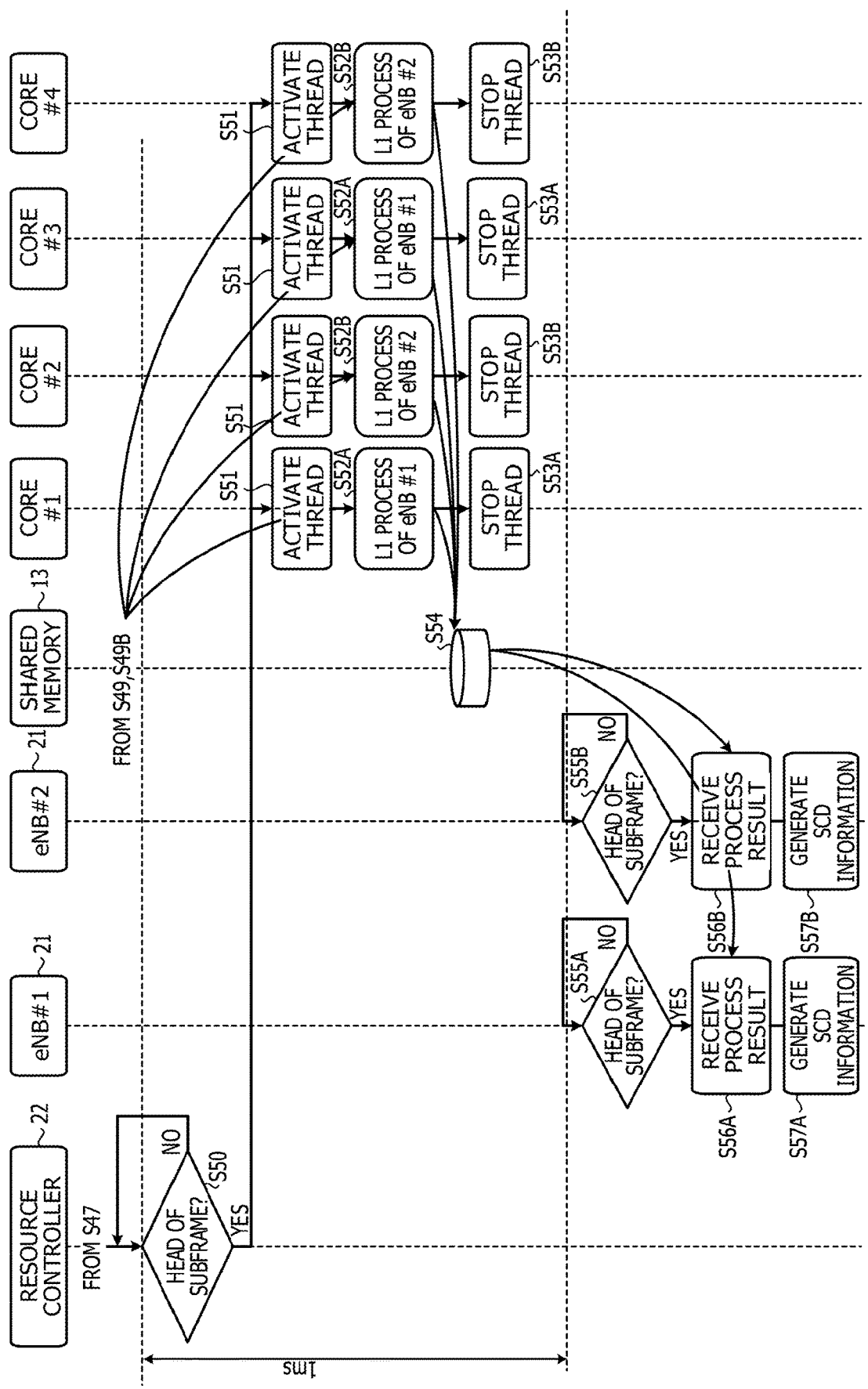

FIGS. 9A and 9B are sequence diagrams illustrating one example of process operations by the resource controller 22, the eNB 21, and the CPU 11 related to the time when the first setting process is executed. The eNB #1 determines whether the head of a subframe is detected (step S41A). Moreover, the eNB #2 also determines whether the head of a subframe is detected (step S41B). If the head of a subframe is detected (Yes at step S41A), the eNB #1 receives a process result (step S42A). The eNB #1 generates SCD information based on the process result (step S43A). The eNB #1 notifies the resource controller 22 of the generated SCD information (step S44).

If the head of a subframe is detected (Yes at step S41B), the eNB #2 also receives a process result (step S42B). The eNB #2 generates SCD information based on the process result (step S43B). The eNB #2 notifies the resource controller 22 of the generated SCD information (step S44).

If the SCD information from each eNB 21 is received, the resource controller 22 executes a first setting process (step S45). The resource controller 22 determines whether resources of the eNBs #1 and #2 are secured (step S46). If the resources are secured (Yes at step S46), the resource controller 22 notifies each of the eNBs #1 and #2 of an SCD result including the resource information (step S47). The eNB #1 receives the SCD result, sets the received SCD result (step S48A), and sets the SCD result to the shared memory 13 (step S49A). Moreover, if the SCD result is also received, the eNB #2 sets the received SCD result (step S48B), and sets the SCD result to the shared memory 13 (step S49B).

Next, the resource controller 22 determines whether the head of a next subframe is detected (step S50). If the head of the subframe is detected (Yes at step S50), the resource controller 22 activates, based on the SCD result in the shared memory 13, for example, threads on the cores #1 to #4 (step S51). For example, the cores #1 and #3 respectively execute, based on the SCD result in the shared memory 13, the L1 process of the eNB #1 (step S52A). In addition, the cores #2 and #4 respectively execute, based on the SCD result in the shared memory 13, the L1 process of the eNB #2 (step S52B). Further, the cores #1 and #3 respectively stop the threads being activated after the execution of the L1 process of the eNB #1 (step S53A). Further, the cores #2 and #4 respectively stop the threads being activated after the execution of the L1 process of the eNB #2 (step S53B).

The cores #1 to #4 respectively set process results after the execution of the L1 process to the shared memory 13 (step S54). Further, the eNBs #1 and #2 each determine whether the head of a next subframe is detected (steps S55A and S55B). If the head of a subframe is detected (Yes at step S55A and Yes at step S55B), the eNBs #1 and #2 each receive a process result (steps S56A and S56B). The eNBs #1 and #2 each generate SCD information based on the process result (steps S57A and S57B). The eNBs #1 and #2 each notify the resource controller 22 of SCD information, and execute the process operations at a step S45 and subsequent steps.

Moreover, if the resources have been unable to be secured (No at step S46), the resource controller 22 requests the SCD 45 in each of the eNBs #1 and #2 to reconsider the SCD information (step S58). Further, the SCD 45 in each of the eNBs #1 and #2 reconsiders the SCD information in response to the reconsider request (steps S59A and S59B), and notifies the resource controller 22 of the SCD information after being reconsidered (step S59C). Further, if the SCD information is received at the step S59C, the resource controller 22 shifts the process operation to the step S45 in order to execute the first setting process. If the head of a next subframe is not detected (No at step S50), the resource controller 22 shifts the process operation to the step S50 in order to determine whether the head of a subframe is detected.

The resource controller 22 in the present embodiment acquires SCD information from the SCD 45 in each eNB 21, calculates an amount of resources for the eNB 21 from the SCD information, and dynamically allocates the eNBs 21 to arbitrary cores, out of the plurality of cores in the CPU 11, based on the amount of resources. As a result, it is possible to implement the efficient allocation of the CPU resources with respect to the eNBs 21. In addition, the efficient allocation of the CPU resources is implemented to allow the reduction in the electric power consumption, compared with a case where the electric power consumption that is used in the plurality of eNBs 21 as the whole is individually controlled. In addition, the resources that are requested in order to obtain the same performance is reduced to allow the reduction in the CPU cost.

If the calculated amount of resources for the eNB 21 exceeds the allowable amount of resources, the resource controller 22 requests the SCD 45 in the eNB 21 that is selected based on the priority order to reconsider SCD information. As a result, the amount of resources is reconsidered based on the SCD information after being reconsidered, and the eNB 21 is allocated to an arbitrary core, out of the plurality of cores, based on the amount of resources after being reconsidered.

The resource controller 22 allocates the eNB 21 to an arbitrary core, out of the plurality of cores, based on the priority order in which the maximum transfer amount is allocated with priority for each eNB 21. As a result, the resource controller 22 allocates the eNB 21 to an arbitrary core, out of the plurality of cores, based on the priority order.

The resource controller 22 sets the priority order such that in accordance with the data retention amount in the buffer that holds transfer data for each eNB 21, the eNB 21 with the maximum data retention amount has a higher priority. As a result, it is possible to allocate a core to the eNB 21 having a larger data retention amount with priority.

Note that in the LTE scheme, the load largely varies for each subframe at 1 millisecond, so that the system is unable to normally operate with the post control that uses the CPU load used by the operating system (OS) of the normal server 4. In contrast, in the present embodiment, it is possible to acquire SCD information from the SCD 45 in each eNB 21, calculate an amount of resources for the eNB 21 from the SCD information, and compare with the amount of resources with the allowable amount of resources in the CPU 11, thereby allocating the eNB 21 to an arbitrary core. In other words, even when the load largely varies for each subframe, each eNB 21 is allocated an arbitrary core with efficiency, so that the system is able to normally operate. In addition, for example, although it may be considered that the allocation of the CPU resources is changed for each time slot, such as the daytime or the night, in a case of the present embodiment, it is possible to instantaneously change the allocation of the CPU resources with respect to each eNB 21 in units of subframes.

Note that in the abovementioned first embodiment, the eNBs #1 and #2 are allocated to arbitrary cores, out of the plurality of cores, in accordance with the amount of resources corresponding to the SCD information of each of the eNBs #1 and #2 for each subframe, however, the allocation is not limited to the form of the present embodiment, but may be changed as appropriate. Therefore, for example, an embodiment in which the cores to which the eNBs #1 to #3 are allocated are aggregated is described below as a second embodiment.

Second Embodiment

Figure 10:
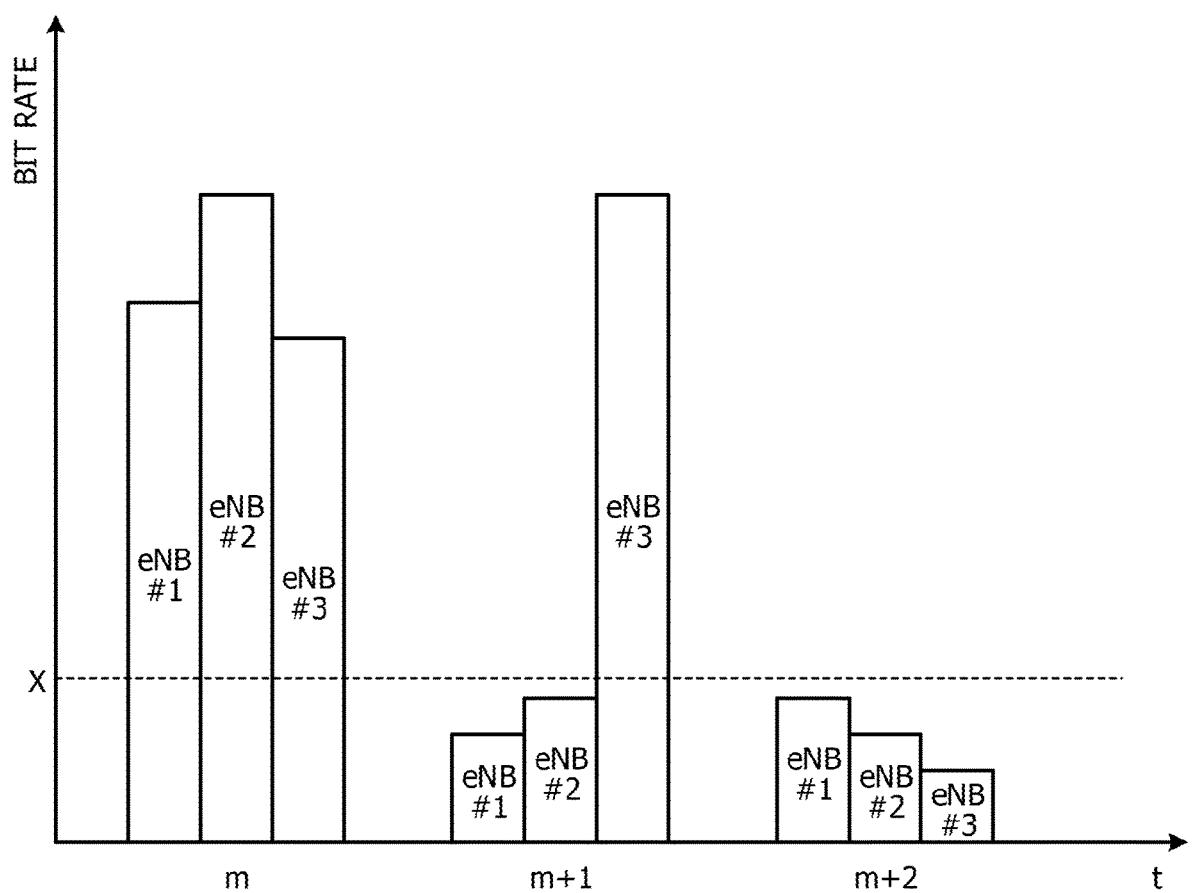
FIG. 10 is an explanation diagram illustrating one example of the bit rate amount of each eNB for each subframe unit.

FIG. 10 is an explanation diagram illustrating one example of the bit rate amount of each eNB 21 for each subframe unit. At the timing of a subframe m illustrated in FIG. 10, indicated is a state where the bit rate amount of each of the eNBs #1 to #3 is larger than a predetermined amount X. Moreover, at the timing of a subframe m+1, indicated is a state where the bit rate amount of the eNB #3 is larger than the predetermined amount X, and the bit rate amount of each of the eNBs #1 and #2 is equal to or less than the predetermined amount X. Moreover, at the timing of a subframe m+2, indicated is a state where the bit rate amount of each of the eNBs #1 to #3 is equal to or less than the predetermined amount X.

Figure 11A:
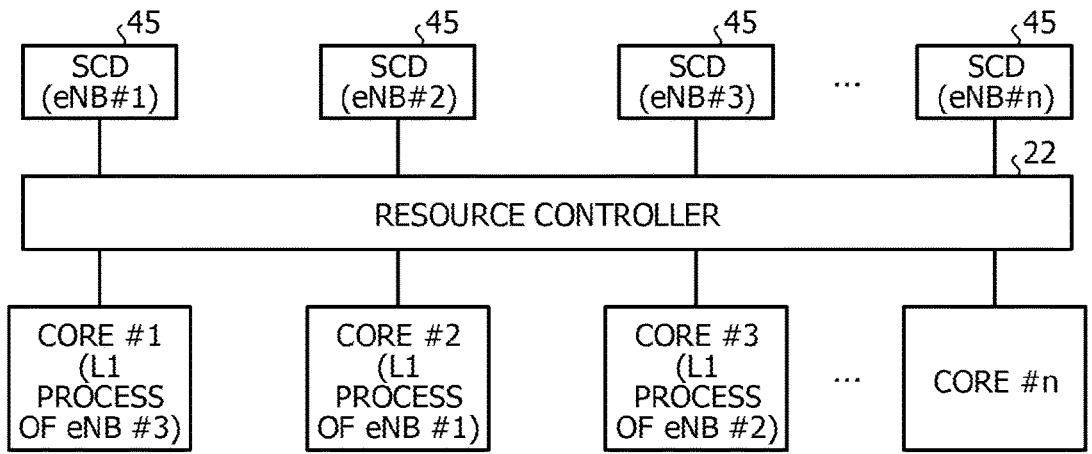
FIG. 11A is an explanation diagram illustrating one example of an operation status of the SCD, the resource controller, and the CPU related to the time when the subframe m is received.

FIG. 11A is an explanation diagram illustrating one example of an operation status of the SCD 45, the resource controller 22, and the CPU 11 related to the time when the subframe m is received. The resource controller 22 allocates, for example, the L1 process of the eNB #3 to the core #1, at the timing of the subframe m. In addition, the resource controller 22 allocates the L1 process of the eNB #1 to the core #2. In addition, the resource controller 22 allocates the L1 process of the eNB #2 to the core #3.

Figure 11B:
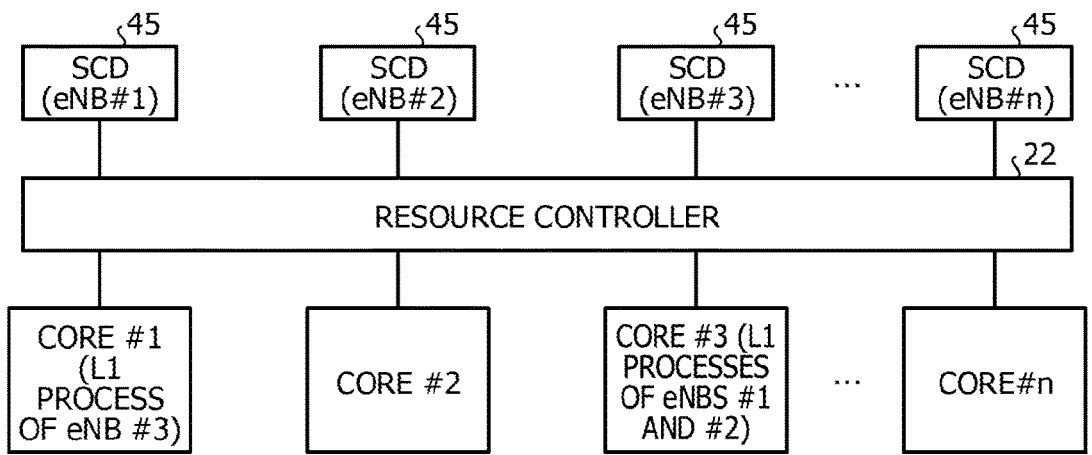
FIG. 11B is an explanation diagram illustrating one example of an operation status of the SCD, the resource controller, and the CPU related to the time when the subframe m+1 is received.

FIG. 11B is an explanation diagram illustrating one example of an operation status of the SCD 45, the resource controller 22, and the CPU 11 related to the time when the subframe m+1 is received. The resource controller 22 allocates the L1 process of the eNB #3 to the core #1, at the timing of the subframe m+1. In addition, the resource controller 22 allocates the L1 processes of the eNBs #1 and #2 to the core #3.

Figure 11C:
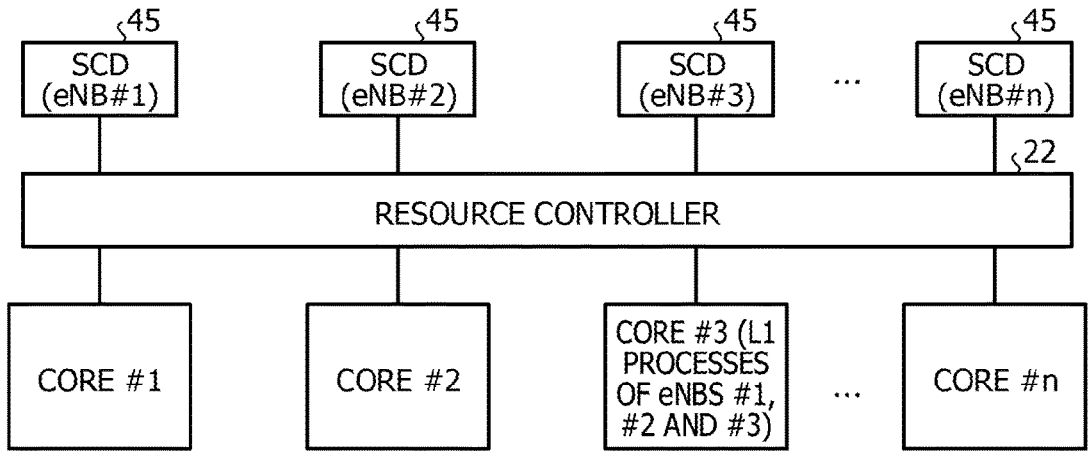
FIG. 11C is an explanation diagram illustrating one example of an operation status of the SCD, the resource controller, and the CPU related to the time when the subframe m+2 is received.

FIG. 11C is an explanation diagram illustrating one example of an operation status of the SCD 45, the resource controller 22, and the CPU 11 related to the time when the subframe m+2 is received. The resource controller 22 allocates the L1 processes of the eNBs #1 to #3 to the core #3, at the timing of the subframe m+2.

Figure 12A:
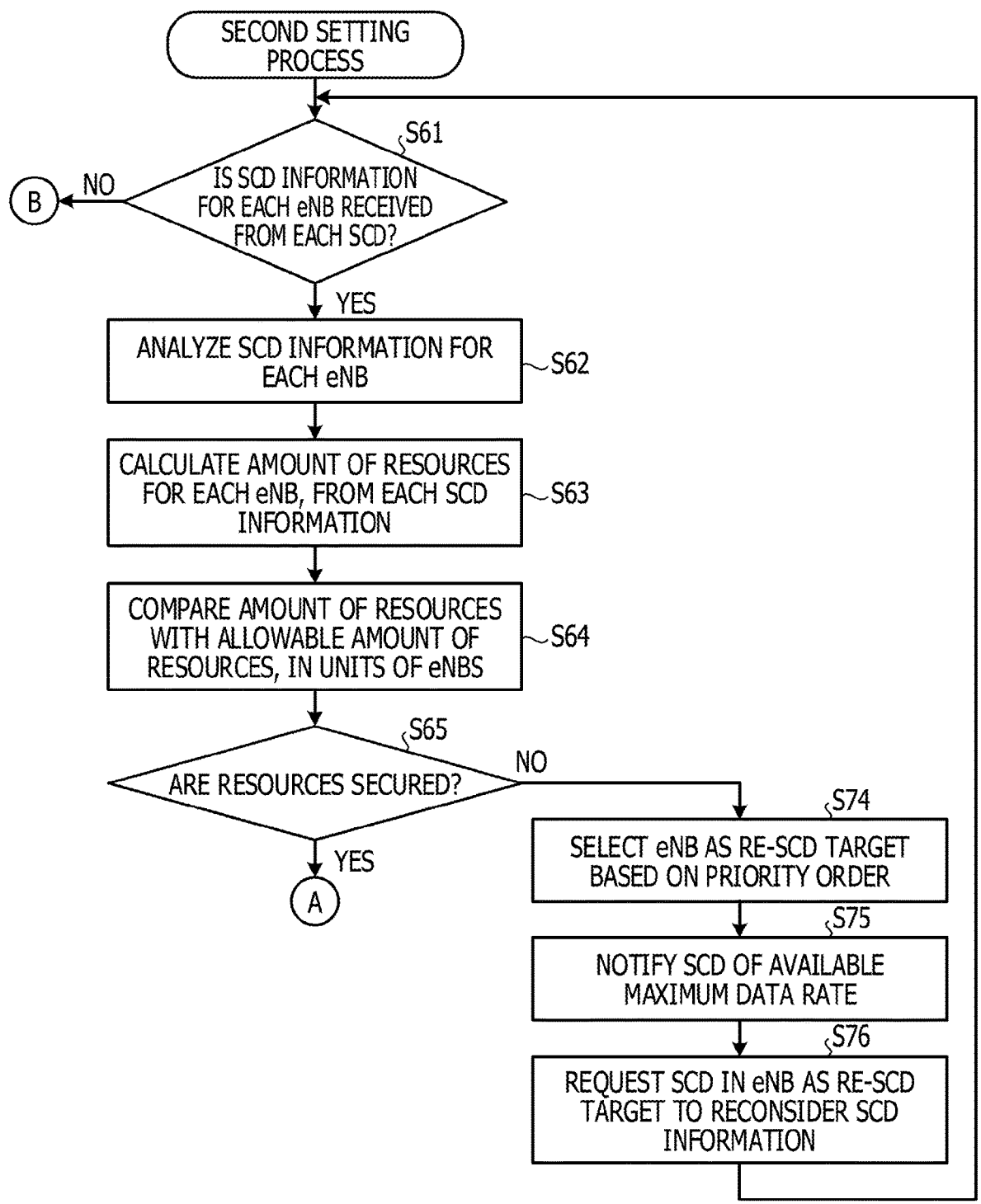
FIGS. 12A and 12B are flowcharts illustrating one example of a process operation by the resource controller related to a second setting process.
Figure 12B:
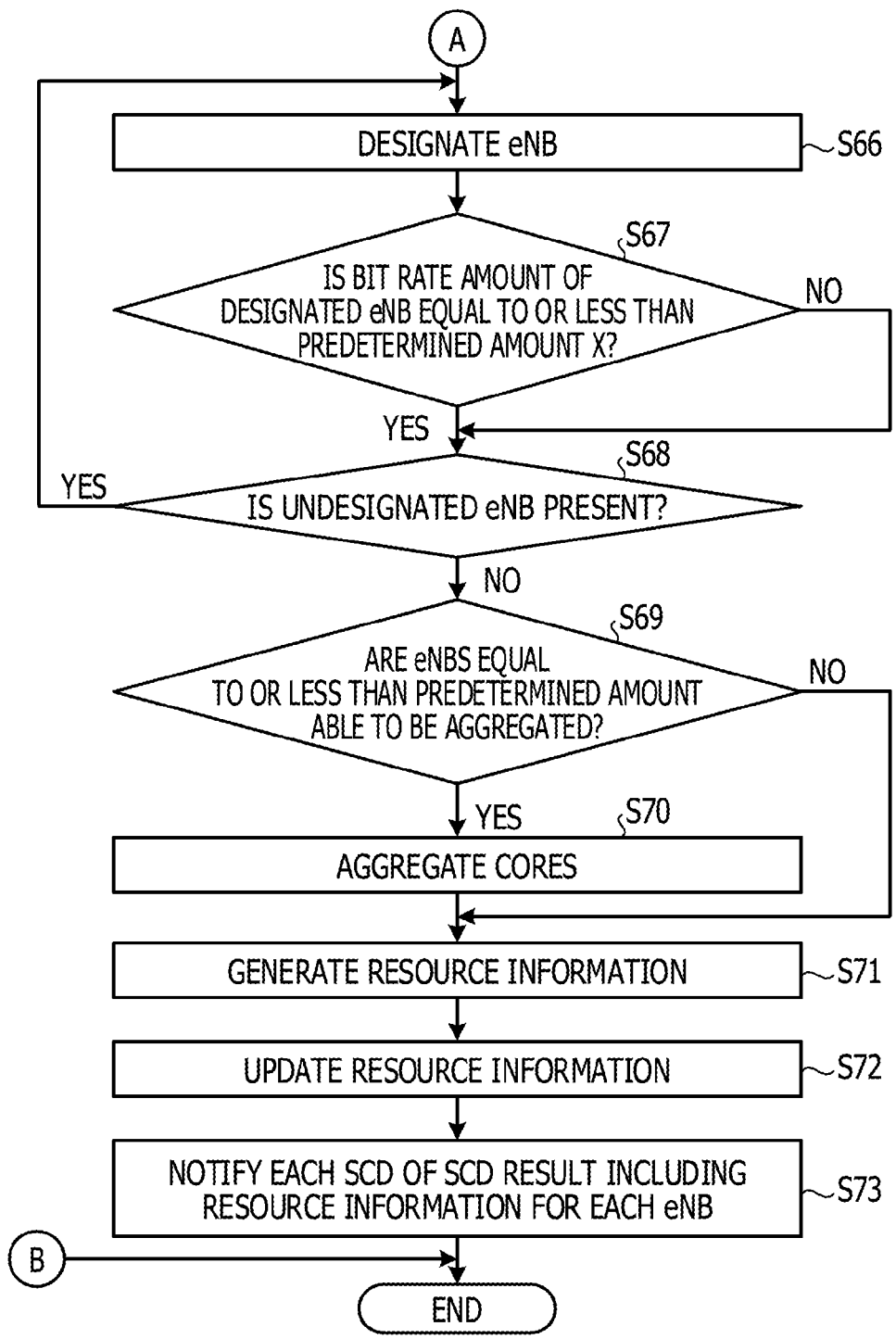

FIGS. 12A and 12B are flowcharts illustrating one example of a process operation by the resource controller 22 related to a second setting process. The resource controller 22 determines whether SCD information for each eNB 21 is received from each SCD 45 (step S61). If SCD information is received (Yes at step S61), the resource controller 22 analyzes the SCD information for each eNB 21 (step S62). The resource controller 22 calculates the amount of resources for each eNB 21 from each SCD (step S63), and compares the amount of resources with the allowable amount of resources of the core, in units of the eNBs 21 (step S64).

The resource controller 22 determines whether the resources for the eNB 21 are secured based on the comparison result (step S65). If the resources for the eNB 21 are secured (Yes at step S65), the resource controller 22 designates an eNB 21 (step S66). The resource controller 22 determines whether the bit rate amount of the designated eNB 21 is equal to or less than the predetermined amount X (step S67).

If the bit rate amount of the designated eNB 21 is equal to or less than the predetermined amount X (Yes at step S67), the resource controller 22 determines whether an undesignated eNB 21 is present (step S68). If no undesignated eNB 21 is present (No at step S68), the resource controller 22 determines whether the eNBs 21 equal to or less than the predetermined amount X are able to be aggregated (step S69).

If the eNBs 21 equal to or less than the predetermined amount X are able to be aggregated (Yes at step S69), the resource controller 22 aggregates the cores that execute the processes of the eNBs 21 equal to or less than the predetermined amount X (step S70). Further, after aggregating the cores that execute the processes of the eNBs 21 equal to or less than the predetermined amount X, the resource controller 22 generates resource information (step S71). The resource controller 22 updates the generated resource information (step S72), notifies the SCD 45 in each eNB 21 of the SCD result including the resource information (step S73), and ends the process operation illustrated in FIG. 12.

If the resources have been unable to be secured (No at step S65), the resource controller 22 selects an eNB 21 as a re-SCD target based on the priority order (step S74). The resource controller 22 notifies the selected eNB 21 of the available maximum data rate (step S75). The resource controller 22 requests the SCD 45 in the eNB 21 as a re-SCD target to reconsider the SCD information (step S76), and shifts the process operation to the step S61 in order to determine whether the SCD information for each eNB 21 is received. If the bit rate amount of the designated eNB 21 is not equal to or less than the predetermined amount X (No at step S67), the resource controller 22 shifts the process operation to the step S68 in order to determine whether an undesignated eNB 21 is present. If an undesignated eNB 21 is present (Yes at step S68), the resource controller 22 shifts the process operation to the step S66 in order to designate the undesignated eNB 21. If the eNBs 21 equal to or less than the predetermined amount X are unable to be aggregated (No at step S69), the resource controller 22 shifts the process operation to the step S71 in order to generate resource information. If SCD information is not received (No at step S61), the resource controller 22 ends the process operation illustrated in FIG. 12.

The resource controller 22 calculates the amount of resources for each eNB 21 based on the SCD information from the SCD 45 in each eNB 21. The resource controller 22 compares the calculated amount of resources with the allowable amount of resources, and determines whether the resources for the eNB 21 are secured. The resource controller 22 secures the resources for the eNB 21, and if the eNB 21 the amount of resources of which is equal to or less than the predetermined amount X is present, aggregates and allocates the eNBs 21 equal to or less than the predetermined amount X to the core.

Figure 13B:
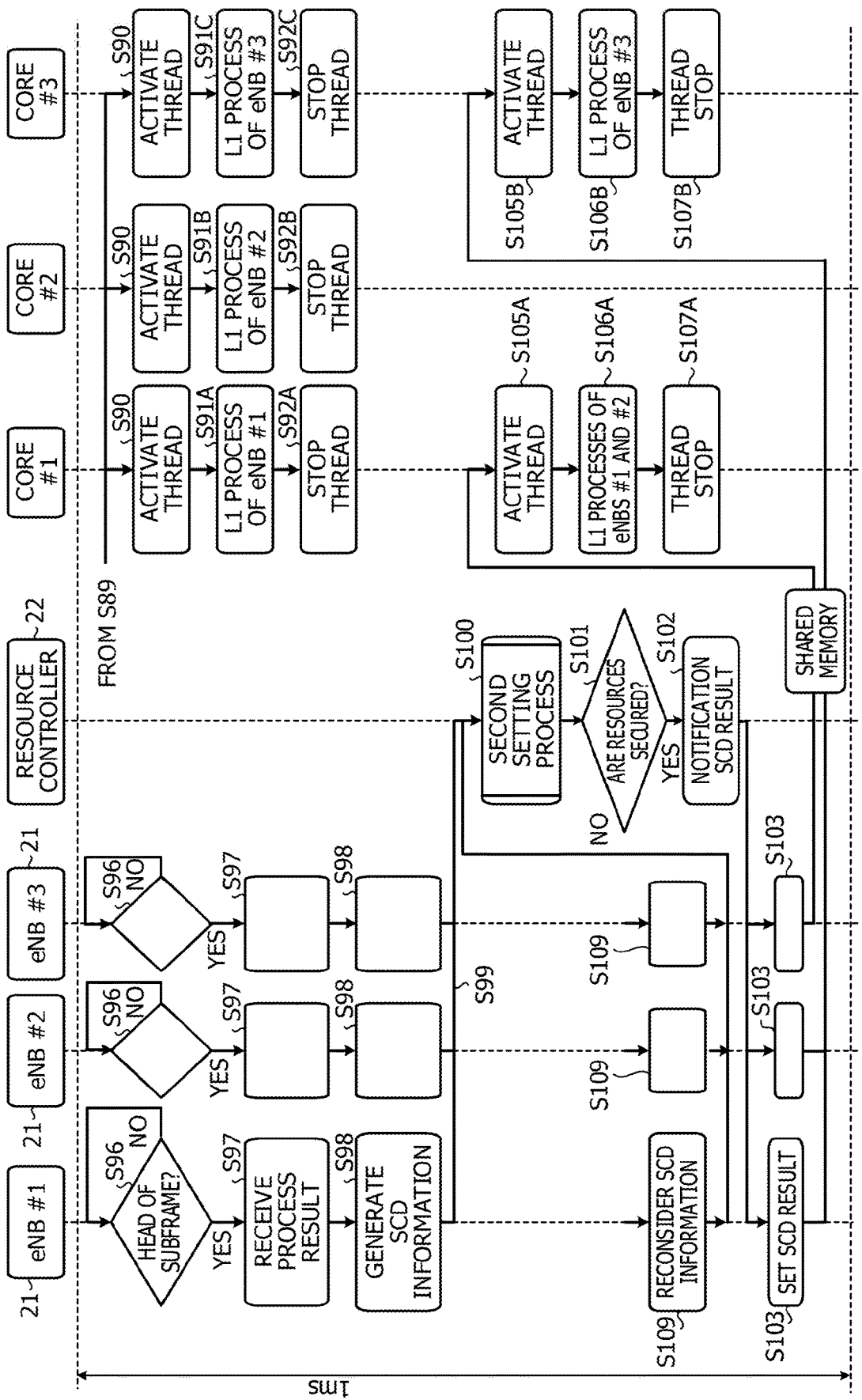

FIGS. 13A, 13B and 13C are sequence diagrams illustrating one example of process operations by the resource controller 22, the eNB 21, and the CPU 11 related to the time when the second setting process is executed. The SCD 45 in each of the eNBs #1 to #3 determines whether the head of a subframe is received (step S81). If the head of a subframe is received (Yes at step S81), the SCD 45 in each of the eNBs #1 to #3 receives a process result (step S82). The SCD 45 in each of the eNBs #1 to #3 generates SCD information based on the received process result (step S83). The SCD 45 in each of the eNBs #1 to #3 notifies the resource controller 22 of the generated SCD information (step S84).

The resource controller 22 executes the second setting process based on the received SCD information of each of the eNBs #1 to #3 (step S85). The resource controller 22 determines whether the resources for the eNBs #1 to #3 are secured (step S86).

If the resources for the eNBs #1 to #3 are secured (Yes at step S86), the resource controller 22 notifies each SCD 45 of an SCD result including the resource information (step S87). The resource controller 22 sets the SCD result for each eNB 21 to each SCD 45 (step S88). Each SCD 45 sets the SCD result for each eNB 21 to the shared memory 13 (step S89). The cores #1 to #3 respectively activate, based on the SCD results in the shared memory 13, threads for the respective eNBs #1 to #3 (step S90). The core #1 executes the L1 process of the eNB #1 based on the SCD result in the shared memory 13 (step S91A). In addition, the core #1 stops the thread after executing the L1 process of the eNB #1 (step S92A). Moreover, the core #2 executes the L1 process of the eNB #2 based on the SCD result in the shared memory 13 (step S91B). In addition, the core #2 stops the thread after executing the L1 process of the eNB #2 (step S92A). Moreover, the core #3 executes the L1 process of the eNB #3 based on the SCD result in the shared memory 13 (step S91C). In addition, the core #3 stops the thread after executing the L1 process of the eNB #3 (step S92C).

If the resources have been unable to be secured (No at step S86), the resource controller 22 requests the SCD 45 in each of the eNBs #1 to #3 to reconsider the SCD information (step S93). The SCD 45 in each of the eNBs #1 to #3 reconsiders the SCD information in response to the reconsider request (step S94), and notifies the resource controller 22 of the SCD information after being reconsidered (step S95). Further, the resource controller 22 shifts the process operation to the step S85 in order to execute the second setting process, based on the SCD information.

Moreover, each eNB 21 determines whether the head of a subframe is detected (step S96). If the head of a subframe is received (Yes at step S96), the SCD 45 in each of the eNBs #1 to #3 receives a process result (step S97). The SCD 45 in each of the eNBs #1 to #3 generates SCD information based on the received process result (step S98). The SCD 45 in each of the eNBs #1 to #3 notifies the resource controller 22 of the generated SCD information (step S99).

The resource controller 22 executes the second setting process based on the received SCD information of each of the eNBs #1 to #3 (step S100). The resource controller 22 determines whether the resources for the eNBs #1 to #3 are secured (step S101).

If the resources for the eNBs #1 to #3 are secured (Yes at step S101), the resource controller 22 notifies each SCD 45 of an SCD result including the resource information (step S102). The resource controller 22 sets the SCD result for each eNB to each SCD 45 (step S103). Each SCD 45 sets the SCD result for each eNB to the shared memory 13 (step S104). The core #1 activates, based on the SCD result in the shared memory 13, the threads of the eNBs #1 and #2 (step S105A). The core #1 executes the L1 processes of the eNBs #1 and #2 based on the SCD result in the shared memory 13 (step S106A). In addition, the core #1 stops the thread after executing the L1 process of the eNB #1 (step S107A). Moreover, the core #3 activates, based on the SCD result in the shared memory 13, the thread of the eNB #3 (step S105B). The core #3 executes the L1 process of the eNB #3 based on the SCD result in the shared memory 13 (step S106B). In addition, the core #3 stops the thread after executing the L1 process of the eNB #3 (step S107B).

If the resources have been unable to be secured (No at step S101), the resource controller 22 requests the SCD 45 in each of the eNBs #1 to #3 to reconsider the SCD information (step S108). Each SCD 45 in the eNBs #1 to #3 reconsiders the SCD information in response to the reconsider request (step S109). The SCD 45 in each of the eNBs #1 to #3 notifies the resource controller 22 of the SCD information after being reconsidered (step S110). The resource controller 22 shifts the process operation to the step S100 in order to execute the second setting process, based on the received SCD information of each of the eNBs #1 to #3.

Moreover, each the eNB #1 to #3 determines whether the head of a subframe is detected (step S111). If the head of a subframe is received (Yes at step S111), the SCD 45 in each of the eNBs #1 to #3 receives a process result (step S112). The SCD 45 in each of the eNBs #1 to #3 generates SCD information based on the received process result (step S113). the SCD 45 in each of the eNBs #1 to #3 notifies the resource controller 22 of the generated SCD information (step S114).

The resource controller 22 executes a second setting process based on the received SCD information of each of the eNBs #1 to #3 (step S115). The resource controller 22 determines whether resources of the eNBs #1 to #3 are secured (step S116).

If the resources for the eNBs #1 to #3 are secured (Yes at step S116), the resource controller 22 notifies each SCD 45 of an SCD result including the resource information (step S117). The resource controller 22 sets the SCD result for each eNB to each SCD 45 (step S118). Each SCD 45 sets the SCD result for each eNB to the shared memory 13 (step S119). The core #1 activates, based on the SCD results in the shared memory 13, threads the respective eNBs #1 to #3 (step S120). The core #1 executes the L1 processes of the eNBs #1 to #3 based on the SCD results in the shared memory 13 (step S121). In addition, the core #1 stops the thread after executing the L1 process of the eNB #1 (step S122).

If the resources have been unable to be secured (No at step S116), the resource controller 22 requests the SCD 45 in each the eNBs #1 to #3 to reconsider the SCD information (step S123). Each SCD 45 in the eNBs #1 to #3 reconsiders the SCD information in response to the reconsider request (step S124). The SCD 45 in each of the eNBs #1 to #3 notifies the resource controller 22 of the SCD information after being reconsidered (step S125). The resource controller 22 shifts the process operation to the step S115 in order to execute the second setting process, based on the received SCD information of each of the eNBs #1 to #3.

When the subframe m illustrated in FIG. 10 is received, the resource controller 22 allocates, as illustrated in FIG. 11A, the L1 process of the eNB #3 to the core #1, the L1 process of the eNB #1 to the core #2, and the L1 process of the eNB #2 to the core #3.

When the subframe m+1 illustrated in FIG. 10 is received, the resource controller 22 allocates, as illustrated in FIG. 11B, the L1 process of the eNB #3 to the core #1, and the L1 processes of the eNB #2 and the eNB #1 to the core #3. In other words, the bit rate amount of each of the eNB #2 and the eNB #1 is equal to or less than the predetermined amount X, so that the L1 processes of the eNB #2 and the eNB #1 are aggregated to the core #3.

When the subframe m+2 illustrated in FIG. 10 is received, the resource controller 22 allocates, as illustrated in FIG. 11C, the L1 processes of the eNB #1, the eNB #2, and the eNB #3 to the core #3. In other words, the bit rate amount of each of the eNBs #1 to #3 is equal to or less than the predetermined amount X, so that the L1 processes of the eNBs #1 to #3 are aggregated to the core #3.

In the second embodiment, when the bit rate amount of an eNB 21 is equal to or less than the predetermined amount X, the L1 process of the eNB 21 is aggregated to an arbitrary core. As a result, the useless operating of the core is suppressed to reduce the electric power consumption, and it is possible to implement the efficient allocation of the resources with respect to the eNB 21.

Note that in the abovementioned present embodiment, the process function of the eNB 21 and the like is distributed and allocated in units of cores in the CPU 11, however, may be allocated in units of the CPUs 11. Moreover, the resources in the CPU 11 or the resources in the core may be distributed and allocated to a plurality of process functions, and the setting is changeable as appropriate.

In the abovementioned present embodiments, the case where the eNB 21 of the LTE scheme is executed on the resources of the cores is exemplified, however, the present embodiments are not limited to the eNB 21 that wirelessly couples the UE 2, but may be, for example, applied to the function of a wireless relay device such as an access point, and is changeable as appropriate. Moreover, the present embodiments are not limited to the LTE scheme, but for example, is applicable to the eNB of 5G or the like.

In the abovementioned present embodiments, as the priority order, for example, the descending order of the data retention amount has been explained. However, the present embodiment is not limited to this, but the number of users, for example, the order of the eNBs 21 in the cell having a large number of RRC coupling users, the data rate achievement, for example, the order of the eNBs 21 in the cell having the large data rate relative to the previous number of predetermined frames, may be employed as the priority order, the priority order is changeable as appropriate.

Moreover, each component in each illustrated unit is not requested to be physically configured as the illustration. In other words, the specific mode of distribution or integration of each unit is not limited to the one as illustrated in the drawings, but the whole or a part thereof may be configured by being functionally or physically distributed or integrated in arbitrary units in accordance with various kinds of loads, use statuses, or the like.

In addition, the whole or an arbitrary part of the various kinds of process functions executed in the respective devices may be executed on the CPU (or the micro computer such as the micro processing unit (MPU) or the micro controller unit (MCU)). Moreover, it is needless to say that the whole or an arbitrary part of the various kinds of process functions may be executed on the program that is analyzed and executed by the CPU (or the micro computer, such as the MPU or the MCU) or on the hardware based on the wired logic.

Figure 14:
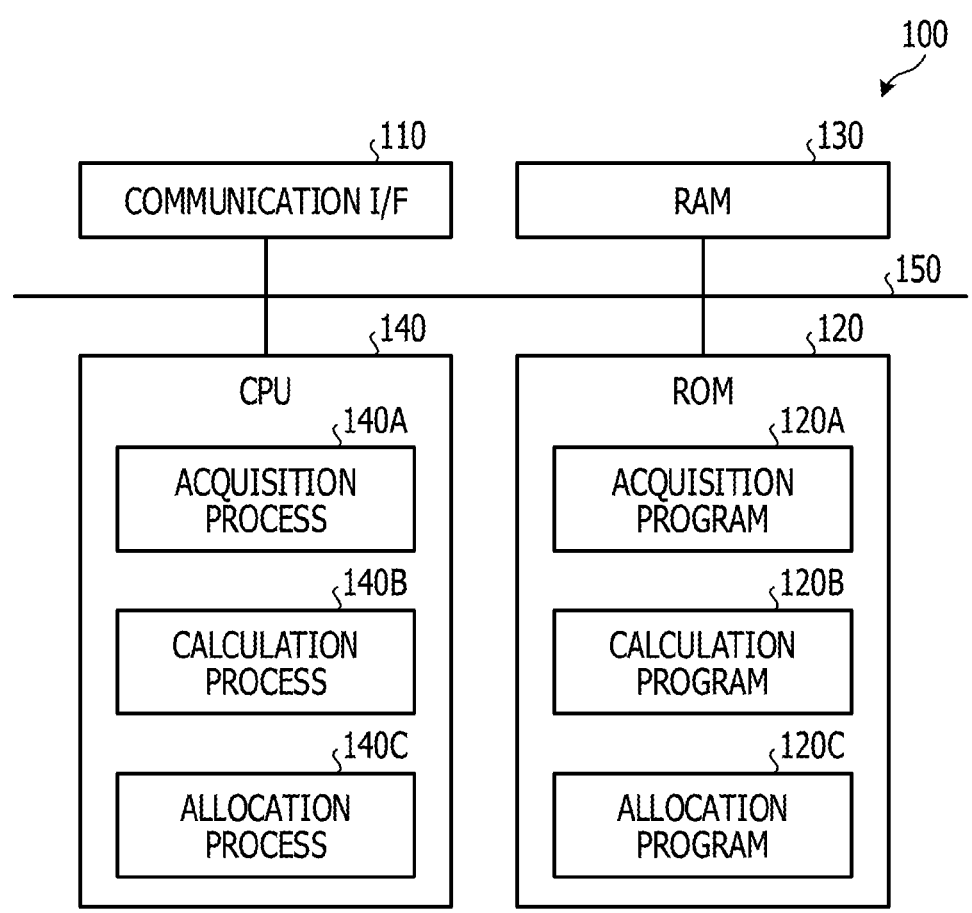
FIG. 14 is a block diagram illustrating one example of an information processing apparatus that executes a resource allocation program.

Meanwhile, the various kinds of processes having been explained in the present embodiment may be implemented such that the processor such as the CPU in the information processing apparatus executes a program prepared in advance. Therefore, one example of the information processing apparatus that executes the program having the function similar to that in the abovementioned embodiments is described below. FIG. 14 is a block diagram illustrating one example of an information processing apparatus that executes a resource allocation program.

An information processing apparatus 100 illustrated in FIG. 14 that executes a resource allocation program includes a communication IF 110, a ROM 120, a RAM 130, and a CPU 140. In addition, the communication IF 110, the ROM 120, the RAM 130, and the CPU 140 are coupled to one another via a bus 150.

Further, the ROM 120 stores therein in advance the resource allocation program that exhibits the function similar to that in the abovementioned present embodiments. The ROM 120 stores therein, as resource allocation programs, an acquisition program 120A, a calculation program 120B, and an allocation program 120C. Note that the information processing program may be recorded not in the ROM 120, but in a computer readable recording medium by a drive, which is not illustrated. Moreover, as a recording medium, for example, a transportable recording medium such as a CD-ROM, a DVD disk, or a USB memory, a semiconductor memory such as a flash memory, or the like may be used.

Further, the CPU 140 functions as an acquisition process 140A by reading the acquisition program 120A from the ROM 120. The CPU 140 functions as a calculation process 140B by reading the calculation program 120B from the ROM 120. The CPU 140 functions as an allocation process 140C by reading the allocation program 120C from the ROM 120.

The CPU 140 allocates the usable resources in the function of the wireless device that is wirelessly coupled to a mobile station. The CPU 140 acquires schedule information related to the wireless communication with the wireless device. The CPU 140 calculates, based on the schedule information of the wireless device, the amount of resources that is used in the function of the wireless device. The CPU 140 allocates, based on the calculated amount of resources, the usable resources in the function of the wireless device. As a result, it is possible to implement the efficient allocation of the resources with respect to the function of the wireless device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus, comprising:
a memory;
a first processor coupled to the memory and configured to:
include a plurality of cores, and
execute a calculation processing for a wireless communication with a terminal device, and
a second processor configured to:
obtain schedule information indicating schedule of the wireless communication,
identify, based on the schedule information, an amount of calculation resource to be used for the calculation processing, and
allocate, based on the identified amount of the calculation resource, at least one of the plurality of cores to the calculation processing for the wireless communication with the terminal device, wherein
the second processor is configured to acquire further schedule information when the identified amount of the calculation resource exceeds a threshold value.

2. The information processing apparatus according to claim 1, wherein
the schedule information is medium access control (MAC) schedule information related to the wireless communication of the terminal device.

3. The information processing apparatus according to claim 1, wherein
when a plurality of functions are executed in the wireless communication with the terminal device, the second processor is configured to distribute the calculation resource to the plurality of functions based on a priority order of each of the plurality of functions.

4. The information processing apparatus according to claim 3, wherein
the priority order is decided in accordance with a retention amount of data to be transmitted by each of the plurality of functions.

5. A method using an information processing apparatus, the method comprising:
obtaining schedule information indicating schedule of wireless communication with a terminal device;
identifying, based on the schedule information, an amount of calculation resource to be used for calculation processing for the wireless communication;
allocating, based on the identified amount of the calculation resource, at least one of a plurality of cores to the calculation processing for the wireless communication with the terminal device, the plurality of cores being included in a first processor that executes the calculation processing; and
acquiring further schedule information when the identified amount of the calculation resource exceeds a threshold value.

6. The method according to claim 5, wherein
the schedule information is medium access control (MAC) schedule information related to the wireless communication of the terminal device.

7. The method according to claim 5, wherein
the information processing apparatus includes the first processor which is a multi-core processor.

8. The method according to claim 5, wherein
when a plurality of functions are executed in the wireless communication with the terminal device, the information processing apparatus distributes the calculation resource to the plurality of functions based on a priority order of each of the plurality of functions.

9. The methods according to claim 8, wherein
the priority order is decided in accordance with a retention amount of data to be transmitted by each of the plurality of functions.

10. A non-transitory computer-readable storage medium storing a program that causes a computer to execute a process, the process comprising:
obtaining schedule information indicating schedule of wireless communication with a terminal device;
identifying, based on the schedule information, an amount of calculation resource to be used for calculation processing for the wireless communication;
allocating, based on the identified amount of the calculation resource, at least one of a plurality of cores to the calculation processing for the wireless communication with the terminal device, the plurality of cores being included in a first processor that executes the calculation processing; and
acquiring further schedule information when the identified amount of resource exceeds a threshold value.

11. The non-transitory computer-readable storage medium according to claim 10, wherein
the schedule information is medium access control (MAC) schedule information related to the wireless communication of the terminal device.

12. The non-transitory computer-readable storage medium according to claim 10, wherein
the information processing apparatus includes the first processor which is a multi-core processor.

13. The non-transitory computer-readable storage medium according to claim 10, the process further comprising:
when a plurality of functions are executed in the wireless communication with the terminal device, the information processing apparatus distributes the calculation resource to the plurality of functions based on a priority order of each of the plurality of functions.

14. The non-transitory computer-readable storage medium according to claim 13, wherein
the priority order is decided in accordance with a retention amount of data to be transmitted by each of the plurality of functions.

* * * * *